US012719297B2

(12) United States Patent
Siverhus et al.

(10) Patent No.: US 12,719,297 B2
(45) **Date of Patent: *Aug. 25, 2026**

(54) BATTERY PACK CHARGER INCLUDING A SETTABLE POWER LEVEL

(71) Applicant: MILWAUKEE ELECTRIC TOOL CORPORATION, Brookfield, WI (US)

(72) Inventors: Rebecca Siverhus, Milwaukee, WI (US); Catherine K. Semon, West Allis, WI (US); Andrew S. Lentz, Wauwatosa, WI (US); Ryan Fox, Franklin, WI (US); Michael Lemberger, Wauwatosa, WI (US); Justin Saboury, Wauwatosa, WI (US); Joe Marco, Milwaukee, WI (US); Joel D. Snyder, Menomonee Falls, WI (US); Eli Zenz, Hudson, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 1061 days.

This patent is subject to a terminal disclaimer.

(21) Appl. No.: 17/731,060

(22) Filed: Apr. 27, 2022

(65) Prior Publication Data

US 2022/0344952 A1 Oct. 27, 2022

Related U.S. Application Data

(60) Provisional application No. 63/180,252, filed on Apr. 27, 2021.

(51) Int. Cl.
*H02J 7/00* (2026.01)
*H02J 7/40* (2026.01)
(Continued)

(52) U.S. Cl.
CPC .................. *H02J 7/70* (2026.01); *H02J 7/40* (2026.01); *H02J 7/80* (2026.01); *H02J 7/933* (2026.01); *H02J 2207/20* (2020.01)

(58) Field of Classification Search
CPC .................................................... H02J 7/0042
(Continued)

(56) References Cited

U.S. PATENT DOCUMENTS

2011/0121783 A1* 5/2011 Boyles .................. H02J 7/0013 320/113
2012/0098495 A1 4/2012 Yang et al.
(Continued)

FOREIGN PATENT DOCUMENTS

CN 111697636 A 9/2020
JP 2008306835 A 12/2008
(Continued)

OTHER PUBLICATIONS

Japanese Patent Office Action for Application No. 2023-565209 dated Jan. 21, 2025 (10 pages including machine English translation).

(Continued)

*Primary Examiner* — Yalkew Fantu
(74) *Attorney, Agent, or Firm* — Michael Best & Friedrich LLP

(57) ABSTRACT

A battery pack charger including a housing, a battery pack receptacle supported by the housing and configured to receive a battery pack, a charging circuit configured to transmit power from a power input circuit to the battery pack receptacle, and a controller. The controller is operable to receive a first input via a user interface, set a first power output level of the charging circuit based on the received first input, and provide the first power output level to the battery pack coupled to the battery pack receptacle.

13 Claims, 8 Drawing Sheets

(51) Int. Cl.

| | |
|---|---|
| ***H02J 7/70*** | (2026.01) |
| ***H02J 7/80*** | (2026.01) |
| ***H02J 7/90*** | (2026.01) |

(58) Field of Classification Search
USPC .......................................................... 320/106
See application file for complete search history.

(56) References Cited

U.S. PATENT DOCUMENTS

| | | | |
|---|---|---|---|
| 2014/0300321 A1 | 10/2014 | Kim et al. | |
| 2015/0123616 A1* | 5/2015 | Oku | H02J 7/0044 320/114 |
| 2016/0099580 A1 | 4/2016 | Kawamura et al. | |
| 2016/0099581 A1 | 4/2016 | Kawamura et al. | |
| 2017/0331162 A1* | 11/2017 | Clarke | H02J 7/0069 |
| 2020/0203969 A1* | 6/2020 | Truettner | H02J 7/00041 |
| 2021/0159718 A1* | 5/2021 | Gaulke | H02J 7/02 |

FOREIGN PATENT DOCUMENTS

| | | |
|---|---|---|
| JP | 2010136490 A | 6/2010 |
| JP | 2010178516 A | 8/2010 |
| JP | 2011019363 A | 1/2011 |
| JP | 2017221031 A | 12/2017 |
| WO | 2014149809 A1 | 9/2014 |

OTHER PUBLICATIONS

Extended European Search Report for Application No. 22796655.3 dated Feb. 18, 2025 (10 pages).

International Search Report and Written Opinion for Application No. PCT/US2022/026566 dated Aug. 22, 2022 (10 pages).

Japanese Patent Office Action for Application No. 2023-565209 dated Oct. 1, 2024 (8 pages including machine English translation).

* cited by examiner

FIG. 2B

FIG. 2A 100, 300
505
535
Fan Control
590
Adapter/Power Output
530
Wireless Communication Controller
500
Controller
560
565
570
Processing Unit
Control Unit
Arithmetic Logic Unit
Registers
540
575
545
Memory
Program Storage
Data Storage
550
Input Units
555
Output Units
580
510
Battery Pack Interface
Power Interrupt
595
Sensor(s)
Indicator(s)
Power Input Circuit
User Interface
515
520
525
585

BATTERY PACK CHARGER INCLUDING A SETTABLE POWER LEVEL

RELATED APPLICATIONS

This application claims the benefit of U.S. Provisional Patent Application No. 63/180,252, filed Apr. 27, 2021, the entire content of which is hereby incorporated by reference.

FIELD

Embodiments described herein relate to a battery pack charger.

SUMMARY

Battery pack chargers include increasingly high power levels for charging the battery packs connectable to the chargers. For example, with fast charging technology, a battery pack charger could potentially overload a circuit breaker when the battery pack charger is connected to an outlet. Temporary power sites often have a limited number of available alternating current ("AC") outlets and multiple users may be drawing power from the same outlet. To reduce the likelihood that a circuit breaker would be tripped by a battery pack charger, the battery pack charger can include the ability to select and control the power level (i.e., Watts) that the battery pack charger draws.

Battery pack chargers described herein provide a user with the ability to select a power consumption level for the battery pack charger. The power consumption level can be selected, for example, from an interface of an external device (e.g., a smart phone).

Embodiments described herein provide a battery pack charger for charging power tool battery packs. The battery pack charger includes a housing, a battery pack receptacle supported by the housing and configured to receive a battery pack, a charging circuit configured to transmit power from a power input circuit to the battery pack receptacle, and a controller. The controller is operable to receive a first input via a user interface, set a first power output level of the charging circuit based on the received first input, and provide the first power output level to the battery pack coupled to the battery pack receptacle.

Embodiment described herein provide a method of controlling a power output level of a battery pack charger. The method includes receiving a first input via a user interface, setting a first power output level of a charging circuit based on the received first input, and providing the first power output level, via the charging circuit, to a battery pack coupled to a battery pack receptacle.

Embodiments described herein provide a battery charging system. The battery charging system includes a battery pack, and a battery pack charger. The battery pack charger includes a housing, a battery pack receptacle supported by the housing and configured to receive a battery pack, a charging circuit configured to transmit power from a power input circuit to the battery pack receptacle, and a controller. The controller is operable to receive a first input via a user interface, set a first power output level of the charging circuit based on the received first input, and provide the first power output level to the battery pack coupled to the battery pack receptacle.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIGS. 2A and 2B illustrate battery packs that can be charged by the charger of FIG. 1, according to embodiments described herein.

DETAILED DESCRIPTION

Figure 1:
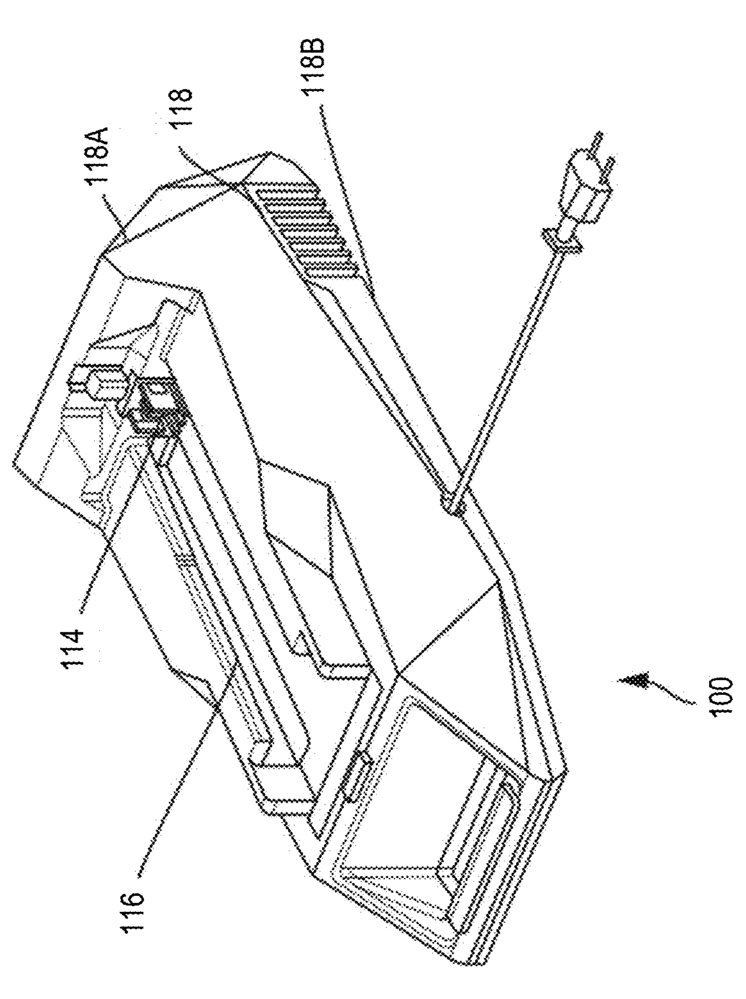
FIG. 1 illustrates a battery pack charger including power level control, according to embodiments described herein.

FIG. 1 illustrates a battery pack charger 100. The battery pack charger 100 has a battery pack charger housing 118 including a top housing portion **118*a* and a bottom housing portion 118*b*. The battery pack charger 100 is configured to receive AC power from an AC power source (e.g., a gridconnected wall outlet or AC generator) to charge a battery pack. The battery charger 100 includes a physical battery pack interface 116 configured to receive and retain a power tool battery pack (e.g., via rails that slidingly engage the corresponding rails of the battery pack) and an electrical battery pack interface 114 (e.g., terminals) configured to engage corresponding electrical contacts of the battery pack. In some embodiments, the battery charger 100 includes additional interfaces 114 and 116** such that it is configured to receive and charge multiple battery packs (e.g., receive and charge two battery packs simultaneously).

Figures 2A, 2B:
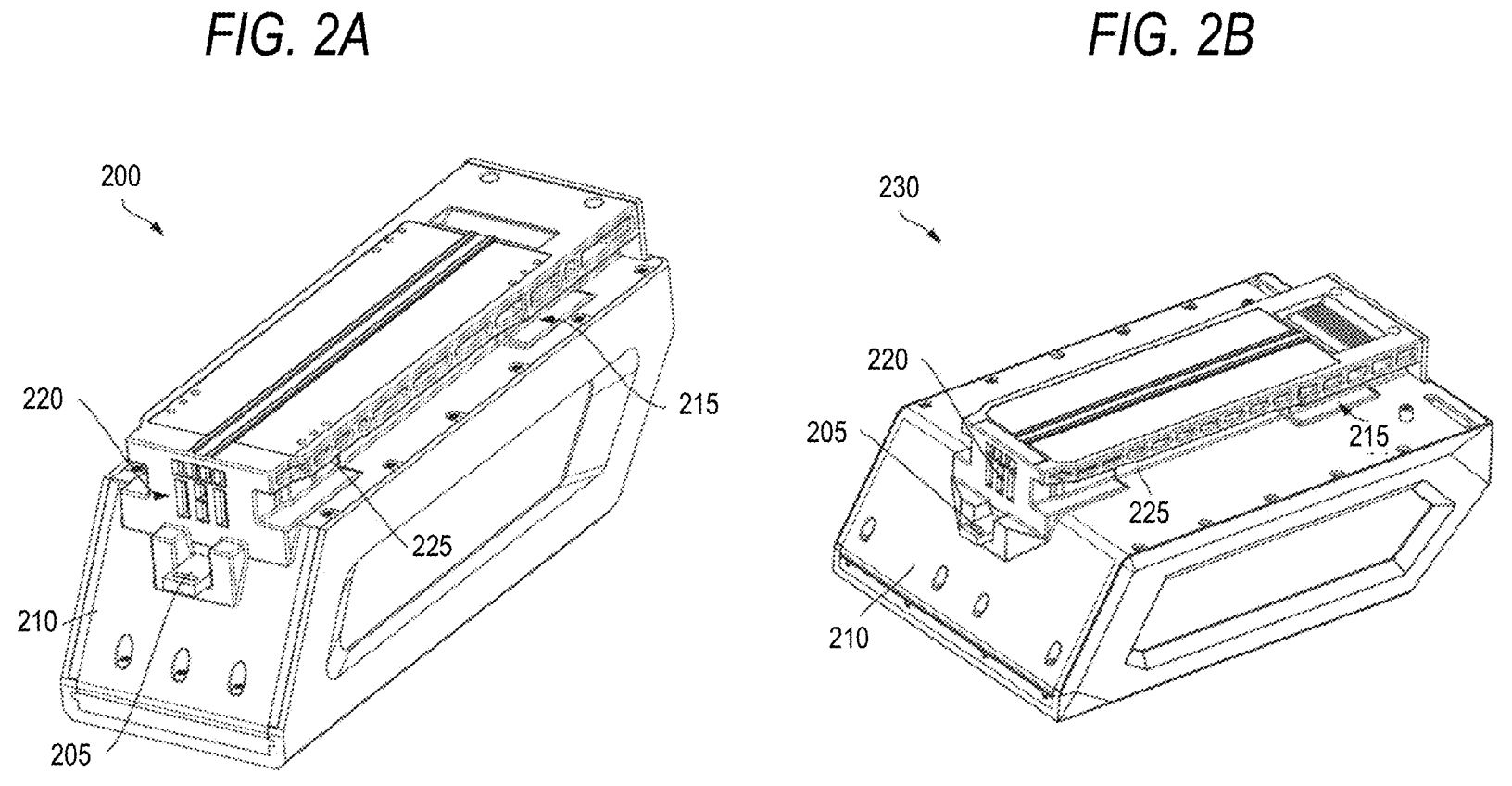

With reference to FIGS. 2A and 2B, the charger 100 is capable of charging various battery pack sizes. In some embodiments, the charger 100 charges a 216 Watt-hour ("Wh") battery pack. In other embodiments, the charger charges a 420 Wh battery pack. In yet another embodiment, the charger charges a 630 Wh battery pack or a 1000 Wh battery pack. In some embodiments, the battery pack is between about a 200 Wh battery pack and a 1000 Wh battery pack.

In some embodiments, the charger 100 charges a battery pack having a power rating below 200 Wh. For example, a 27 Wh battery pack (e.g., 18V nominal voltage and a 1.5 Ah capacity) can be charged by the charger 100. In some embodiments, a 90 Wh battery pack (e.g., 18V nominal voltage and a 5 Ah capacity) can be charged by the charger 100. In some embodiments, a battery pack between 25 Wh and 270 Wh can be charged by the charger 100.

FIG. 2A illustrates a battery pack 200 that is detachable to the charger 100. The battery pack 200 may include one or more cell strings, each having a number (e.g., 10) of battery cells connected in series to provide a desired discharge output (e.g., nominal voltage [e.g., 20 V, 40 V, 60 V, 80 V, 120 V] and current capacity). Accordingly, the battery pack 200 may include "20S1P," "20S2P," etc., configuration. In other embodiments, other combinations of battery cells are also possible.

Each battery cell may have a nominal voltage between 3 V and 5 V and may have a nominal capacity between 3 Ampere-hours (Ah) and 5 Ah. Each battery cell has a diameter of up to about 21 mm and a length of up to about 71 mm. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery pack 200 includes a battery pack housing 210 with a support portion 215 and a battery terminal block 220. The battery pack housing 210 encloses components of the battery pack 200 including the battery cells, a battery controller, etc. The support portion 215 provides a slide-on arrangement with a projection/recess 225 cooperating with a complementary projection/recess 225 of the combination.

FIG. 2B illustrates another embodiment of a battery pack 230 that is detachable to the charger 100. The battery pack 230 having a 20S2P configuration is illustrated in accordance with some embodiments. The battery pack 230 includes two cell strings of twenty series connected cells, the cell strings being connected in parallel. The battery pack 230 includes a battery pack housing 210 with a support portion 215 and a battery terminal block 220. The battery pack housing 210 encloses components of the battery pack 200 including the battery cells, a battery controller, etc. The support portion 215 provides a slide-on arrangement with a projection/recess 225 cooperating with a complementary projection/recess 225 of the combination.

Figure 3:
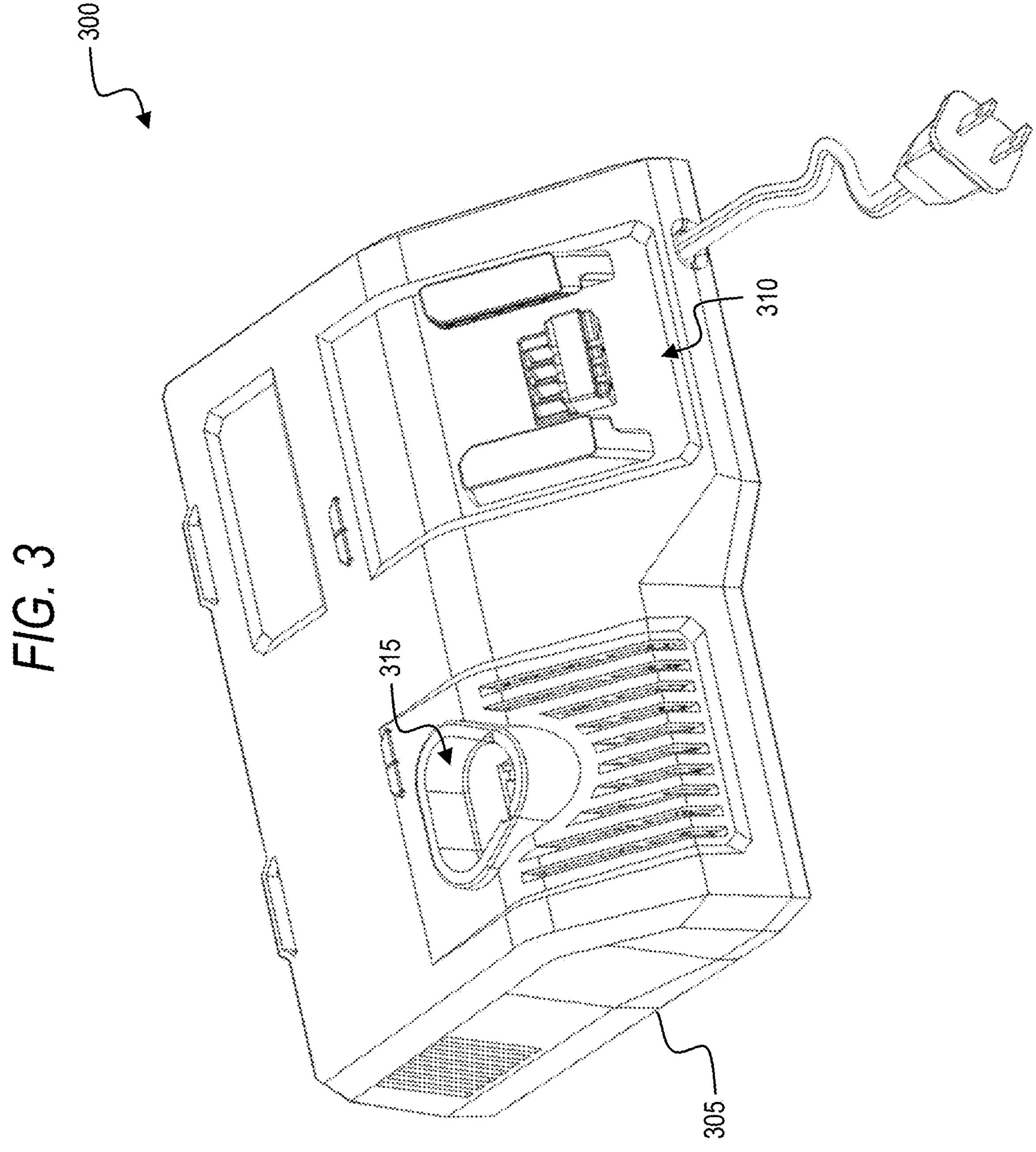
FIG. 3 illustrates a battery pack charger including power level control, according to embodiments described herein.

FIG. 3 illustrates a battery pack charger 300. The battery pack charger 300 includes a housing 305 and interface portions 310, 315 for connecting the battery pack charger 300 to one or more battery packs.

Figure 4:
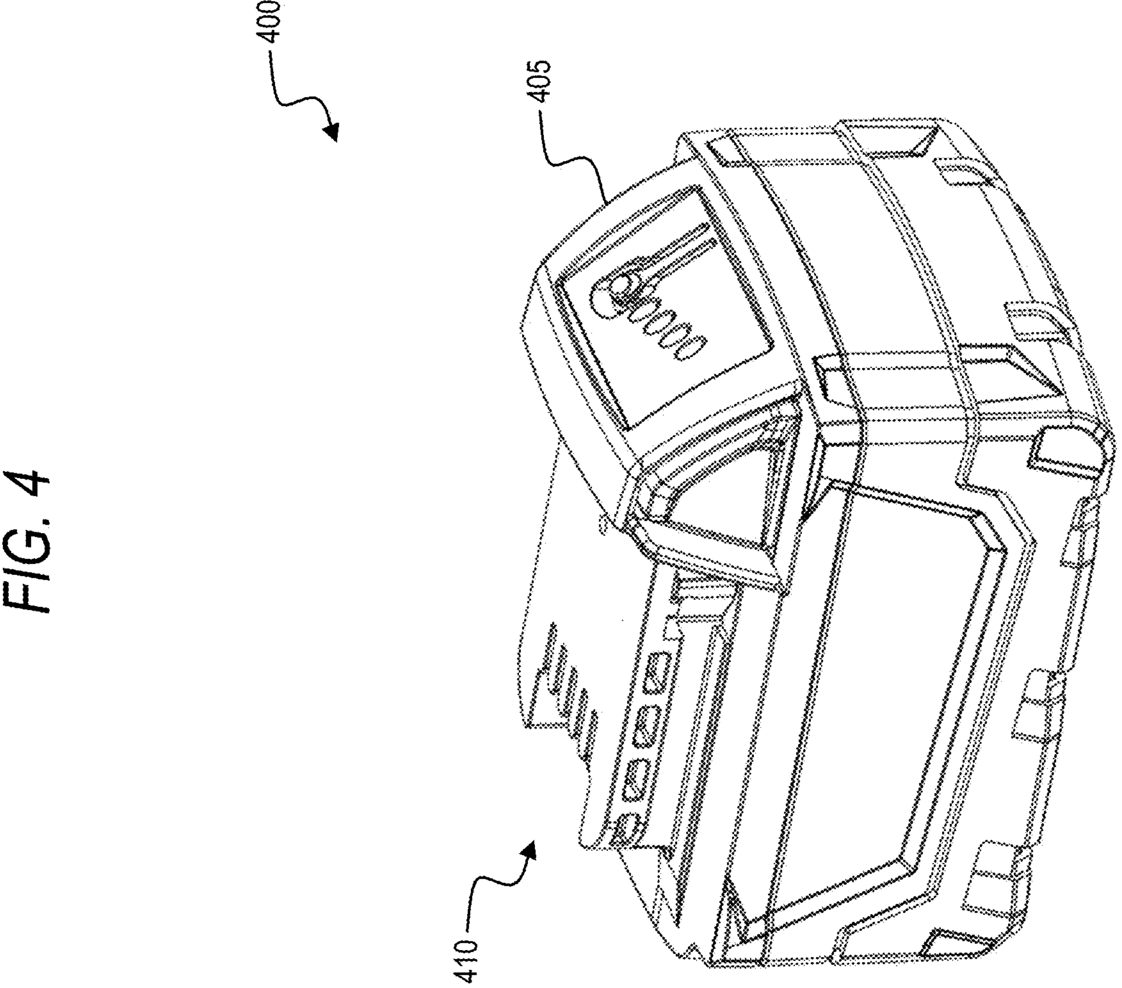
FIG. 4 illustrates a battery pack that can be charged by the charger of FIG. 3, according to embodiments described herein.

FIG. 4 illustrates a battery pack 400 that includes that can be charged by the battery pack charger 300. The battery pack 400 includes a housing 405 and an interface portion 410 for connecting the battery pack 400 to the battery pack charger 300.

The battery pack chargers can receive power from any of a variety of power sources (e.g., AC mains power). The power sources can include 15A, 20A, 30A, etc., AC power sources having voltages of 120V AC, 240V AC, etc.

Figure 5:
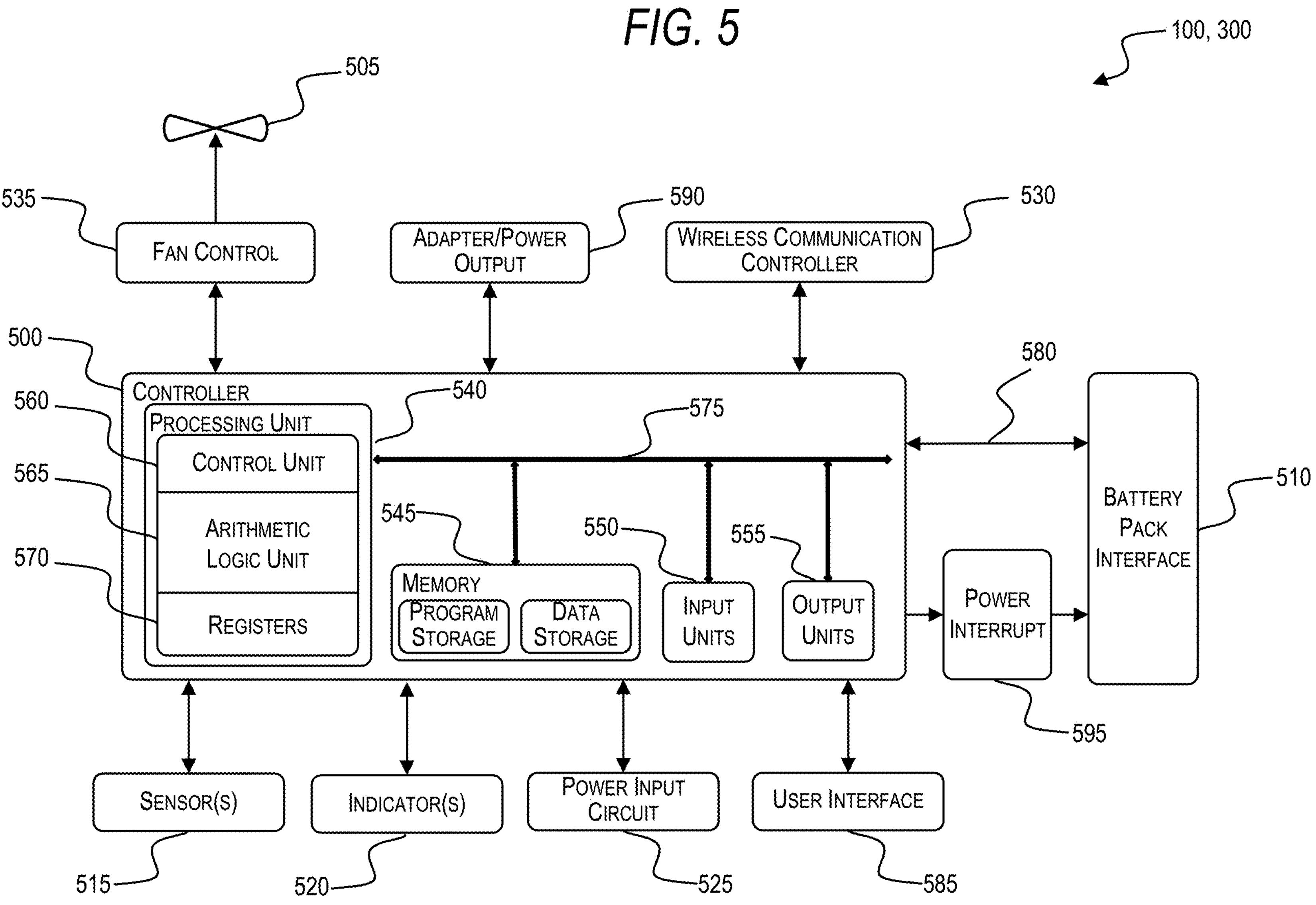
FIG. 5 illustrates a control system for the charger of FIG. 1 or FIG. 3, according to embodiments described herein.

FIG. 5 illustrates a control system for the battery pack charger 100, 300. The control system includes a controller 500. The controller 500 is electrically and/or communicatively connected to a variety of modules or components of the battery pack charger 100, 300. For example, the illustrated controller 500 is electrically connected to a fan 505, a battery pack interface 510, one or more sensors or sensing circuits 515 (e.g., current sensors, temperature sensors, etc.), one or more indicators 520, a power input circuit 525, a wireless communication controller 530 (e.g., a wireless transceiver), and a fan control module or circuit 535. The controller 500 includes combinations of hardware and software that are operable to, among other things, control the operation of the battery pack charger 100, 300, determine a temperature of a heatsink, activate the indicators 520 (e.g., one or more LEDs), etc. In some embodiments, the battery pack charger 100, 300 includes a user interface 585 that includes one or more buttons or switches for selecting a power level for the battery pack charger 100, 300. In some embodiments, a high power mode (e.g., 1,000 W), a medium power mode (e.g., 750 W), and a low power mode (e.g., 500 W) can be selected with the user interface 585. In other embodiments, additional or configurable (e.g., changing the power level [Watt level] of the mode) operational modes are available. In some embodiments, the power level of the battery pack charger 100, 300 is settable to any value between 0 Watts and 2,000 Watts. In some embodiments, a user can also select charge rates and/or charge times (e.g., time of day, specific time, etc.) with the user interface 585. In some embodiments, the battery pack charger 100, 300 includes an adapter or power output 590 that allows other devices to be plugged into the battery pack charger 100, 300 via one or more power outputs (e.g., AC outlets, DC outlets, USB ports, etc.). In some embodiments, the battery pack charger 100, 300 includes a power interrupt 595, such as a circuit breaker. The power interrupt 595 is configured to or is controlled by the controller 500 to interrupt output power to the battery pack interface 510 based on, for example, a total output power of the battery pack charger 100, 300.

The controller 500 includes a plurality of electrical and electronic components that provide power, operational control, and protection to the components and modules within the controller 500 and/or battery pack charger 100, 300. For example, the controller 500 includes, among other things, a processing unit 540 (e.g., a microprocessor, a microcontroller, an electronic controller, an electronic processor, or another suitable programmable device), a memory 545, input units 550, and output units 555. The processing unit 540 includes, among other things, a control unit 560, an ALU 565, and a plurality of registers 570 (shown as a group of registers in FIG. 5), and is implemented using a known computer architecture (e.g., a modified Harvard architecture, a von Neumann architecture, etc.). The processing unit 540, the memory 545, the input units 550, and the output units 555, as well as the various modules or circuits connected to the controller 500 are connected by one or more control and/or data buses (e.g., common bus 575). The control and/or data buses are shown generally in FIG. 5 for illustrative purposes.

The memory 545 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 540 is connected to the memory 545 and executes software instructions that are capable of being stored in a RAM of the memory 545 (e.g., during execution), a ROM of the memory 545 (e.g., on a generally permanent basis), or another non-transitory computer readable medium such as another memory or a disc. Software included in the implementation of the battery pack charger 100, 300 can be stored in the memory 545 of the controller 500. The software includes, for example, firmware, one or more applications, program data, filters, rules, one or more program modules, and other executable instructions. The controller 500 is configured to retrieve from the memory 545 and execute, among other things, instructions related to the control processes and methods described herein. In other constructions, the controller 500 includes additional, fewer, or different components.

The battery pack interface 510 includes a combination of mechanical components (e.g., rails, grooves, latches, etc.) and electrical components (e.g., one or more terminals) configured to and operable for interfacing (e.g., mechanically, electrically, and communicatively connecting) the battery pack charger 100, 300 with a battery pack (e.g., battery pack 200, 230, 400). For example, the battery pack interface 510 is configured to receive power through a charging circuit via a power input circuit. The battery pack interface 510 is also configured to communicatively connect to the controller 500 via a communications line 580.

In some embodiments, the controller 500 is configured to control the transfer of power to the charging circuits based on a selected power level. For example, the controller 500 may receive an input via the wireless communication controller 530 or a user interface of the battery pack charger 100, 300 that sets a power level/operation mode of the battery pack charger 100, 300 to output a set amount of power to a battery pack (e.g., battery pack 200, 230, 400) coupled to the battery pack charger 100, 300 via the battery pack interface. For example, the input may be one of a high power mode, a medium power mode, or a low power mode. The selectable power level control for the battery pack charger 100, 300 will be explained below with respect to FIG. 8.

In some embodiments, the controller 500 controls switches coupled to the power input circuit 525 to output an appropriate or selected amount of power to the charging circuit, based on the set power level. The power input circuit 525 receives power from an external power source (e.g., a conventional wall outlet, one or more batteries, etc.) or an internal power source (e.g., one or more battery cells). In some embodiments, the charging circuit receives power from the power input circuit 525 and controls the amount of power output to the battery pack interface 510 based on the set power level. The power input circuit 525 may include a rectifier circuit for converting input AC power (e.g., from a conventional wall outlet) to direct current ("DC") power that is used by the charging circuit to charge the battery back coupled to the battery pack interface 510.

Figure 6:
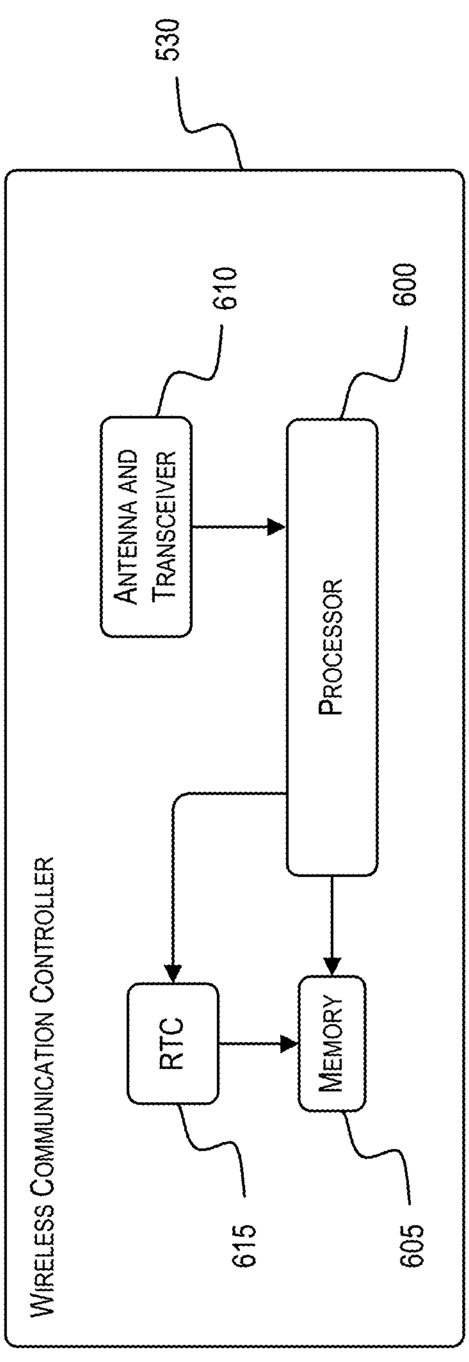
FIG. 6 illustrates a wireless communication controller for the charger of FIG. 1 or FIG. 3, according to embodiments described herein.

FIG. 6 illustrates a wireless communication controller 530 for the battery pack charger 100, 300. The wireless communication controller 530 includes a processor 600, a memory 605, an antenna and transceiver 610, and a real-time clock (RTC) 615. The wireless communication controller 530 enables the battery pack charger 100, 300 to communicate with an external device 700 (see, e.g., FIG. 7). The radio antenna and transceiver 610 operate together to send and receive wireless messages to and from the external device 700 and the processor 600. The memory 605 can store instructions to be implemented by the processor 600 and/or may store data related to communications between the battery pack charger 100, 300 and the external device 700, or the like. The processor 600 for the wireless communication controller 530 controls wireless communications between the battery pack charger 100, 300 and the external device 700. For example, the processor 600 associated with the wireless communication controller 530 buffers incoming and/or outgoing data communicates with the controller 500, and determines the communication protocol and/or settings to use in wireless communications. The communication via the wireless communication controller 530 can be encrypted to protect the data exchanged between the battery pack charger 100, 300 and the external device 700 from third parties.

In the illustrated embodiment, the wireless communication controller 530 is a Bluetooth® controller. The Bluetooth® controller communicates with the external device 700 employing the Bluetooth® protocol. Therefore, in the illustrated embodiment, the external device 700 and the battery pack charger 100, 300 are within a communication range (i.e., in proximity) of each other while they exchange data. In other embodiments, the wireless communication controller 530 communicates using other protocols (e.g., Wi-Fi, ZigBee, a proprietary protocol, etc.) over different types of wireless networks. For example, the wireless communication controller 530 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, 4GSM network, a 4G LTE network, 5G New Radio, a Digital AMPS ("IS-136/TDMA") network, or an Integrated Digital Enhanced Network ("iDEN") network, etc.

The wireless communication controller 530 is configured to receive data from the controller 500 and relay the information to the external device 700 via the antenna and transceiver 610. In a similar manner, the wireless communication controller 530 is configured to receive information (e.g., configuration and programming information) from the external device 700 via the antenna and transceiver 610 and relay the information to the controller 500.

The RTC 615 increments and keeps time independently of the other components. Having the RTC 615 as an independently powered clock (e.g., by coin cell battery) enables time stamping of operational data (stored in memory 605 for later export).

Figure 7:
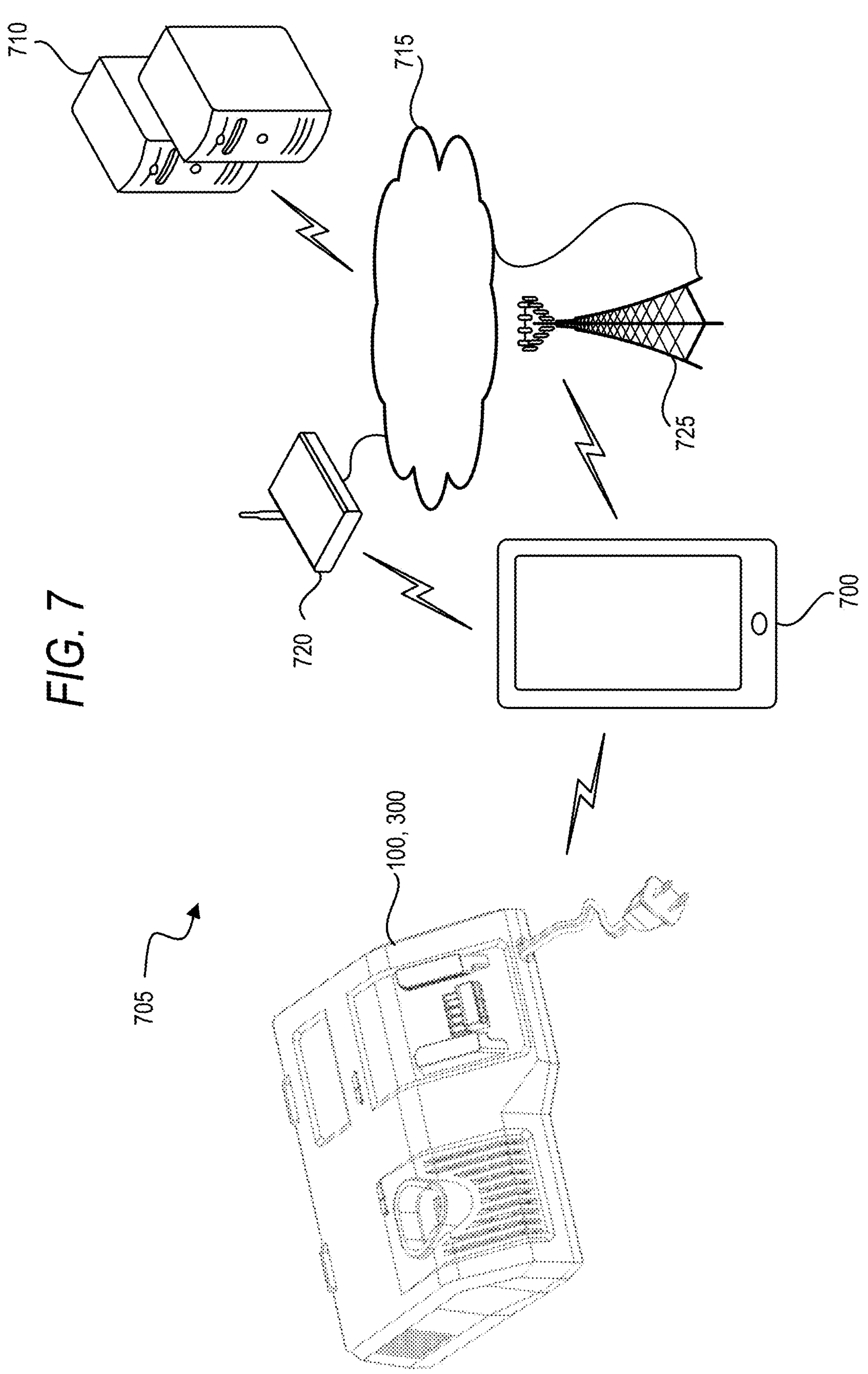
FIG. 7 illustrates a communication network for the charger of FIG. 1 or FIG. 3, according to embodiments described herein.

FIG. 7 illustrates a communication system 705. The communication system 705 includes battery pack charger 100, 300 and the external device 700. Each battery pack charger 100, 300 and the external device 700 can communicate wirelessly while they are within a communication range of each other. Each battery pack charger 100 may communicate status, operation statistics, identification, sensor data, usage information, maintenance data, and the like.

Using the external device 700, a user can access operational parameters of the battery pack charger 100, 300. With the parameters (e.g., charger operational parameters), a user can select an operational power level (e.g., output power level, input power level, etc.) for the battery pack charger 100, 300. The external device 700 can also transmit data to the battery pack charger 100, 300 for charger configuration, firmware updates, or to send commands. The external device 700 also allows a user to set operational parameters, safety parameters, select other operational modes, and the like for the battery pack charger 100, 300.

The external device 700 is, for example, a smart phone (as illustrated), a laptop computer, a tablet computer, a personal digital assistant (PDA), or another electronic device capable of communication wirelessly with the battery pack charger 100, 300 and providing a user interface. The external device 700 provides the user interface and allows a user to access and interact with the battery pack charger 100, 300. The external device 700 can receive user inputs to determine operational parameters, enable or disable features, and the like. The user interface of the external device 700 provides an easy-to-use interface for the user to control and customize operation of the battery pack charger 100, 300. The external device 700, therefore, grants the user access to the operational data of the battery pack charger 100, 300, and provides a user interface such that the user can interact with the controller 500 of the battery pack charger 100, 300.

In addition, as shown in FIG. 7, the external device 700 can also share operational data obtained from the battery pack charger 100, 300 with a remote server 710 connected through a network 715. The remote server 710 may be used to store the operational data obtained from the external device 700, provide additional functionality and service to the user, or a combination thereof. In some embodiments, storing the information on the remote server 710 allows a user to access the information from a plurality of different locations. In some embodiments, the remote server 710 collects information from various users regarding their devices and provide statistics or statistical measures to the user based on information obtained from the different devices. The network 715 may include various networking elements (routers 720, hubs, switches, cellular towers 725, wired connections, wireless connections, etc.) for connecting to, for example, the Internet, a cellular data network, a local network, or a combination thereof as previously described. In some embodiments, the battery pack charger 100, 300 is configured to communicate directly with the server 710 through an additional wireless interface or with the same wireless interface that the battery pack charger 100, 300 uses to communicate with the external device 700.

Figure 8:
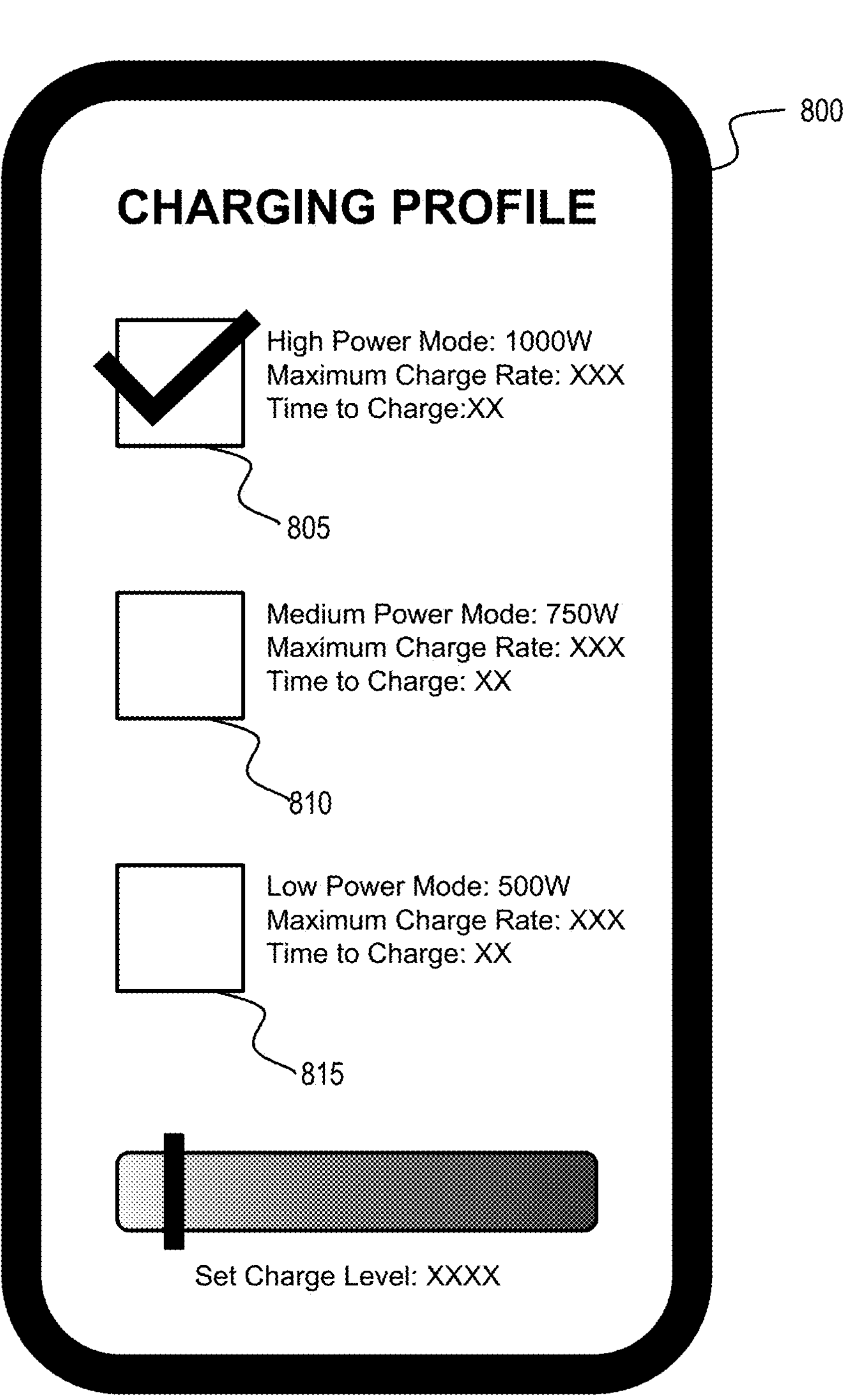
FIG. 8 illustrates an interface for controlling a power level of the charger of FIG. 1 or FIG. 3, according to embodiments described herein.

FIG. 8 illustrates an interface 800 of the external device 700 or the battery pack charger 100, 300 for selecting a power level for the battery pack charger 100, 300. In the illustrated embodiment, a high power mode 805 (e.g., 1,000 W), a medium power mode 810 (e.g., 750 W), and a low power mode 815 (e.g., 500 W) can be selected. In other embodiments, additional or configurable (e.g., changing the power level [Watt level] of the mode) operational modes are available. In some embodiments, the power level of the battery pack charger 100, 300 is settable to any value between 0 Watts and 2,000 Watts. In some embodiments, a user can also select charge rates and/or charge times (e.g., time of day, specific time, etc.). In some embodiments, the battery pack charger 100, 300 is configured to automatically control its power level. For example, the controller 500 of the battery pack charger 100, 300 is configured to reduce the power level supplied to the battery pack interface 510 based on a detected use of other devices drawing power from the same outlet or power supply that provides power to the power input circuit 525.

In some embodiments, the battery pack charger 100, 300 includes the adapter 590 to allow other devices to be plugged into outlets on the battery pack charger 100, 300. In this way, the battery pack charger 100, 300 can monitor total power consumption and regulate its power level accordingly so as not to trip a circuit breaker (e.g., power interrupt 595). For example, the battery pack charger 100, 300 may output power to a battery pack coupled to the battery pack interface 510 in the high power mode 805 and to a device electrically connected to the adapter in the low power mode 815. Based on the monitored total power consumption exceeding a threshold value (e.g., 1400 W), the controller 500 of the battery pack charger 100, 300 may reduce the output power to at least one of the battery pack and the device. For example, the controller 500 may reduce the power output to battery pack to a medium power mode to ensure that the total power consumption is less than the threshold value, thus averting any potential of tripping the circuit breaker (e.g., power interrupt 595).

In some embodiments, the battery pack charger 100, 300 must be plugged in to a power source to change is operating power level. In some embodiments, a charging cycle of the battery pack charger 100, 300 is re-cycled if the power level changes while the battery pack charger 100, 300 is charging a battery pack.

In some embodiments, the battery pack charger 100, 300 includes an internal battery core that is used to charge the battery packs 200, 230, 400. In such embodiments, the battery pack charger can include passthrough circuitry for providing input power to the charging interfaces without providing additional power to the internal battery core (e.g., to reduce power consumption).

Thus, embodiments described herein provide, among other things, systems and methods for controlling a battery pack charger by selecting a power consumption level for the battery pack charger. The power consumption level can be selected, for example, from an interface of an external device (e.g., a smart phone). Various features and advantages of the invention are set forth in the following claims.

We claim:

1. A battery pack charger comprising: a housing; a battery pack receptacle supported by the housing, the battery pack receptacle configured to receive a battery pack; a charging circuit configured to transmit power from a power input circuit to the battery pack receptacle; and a controller operable to: receive a first input via a user interface, set a first power output level of the charging circuit based on the received first input, and provide the first power output level to the battery pack coupled to the battery pack receptacle, wherein the first input is one of a low power mode, a medium power mode, a high power mode, and a set power output value.

2. The battery pack charger of claim 1, wherein the controller is further operable to:

receive a second input via the user interface;

set a second power output level, different than the first power output level, of the charging circuit based on the received second input; and provide the second power output level to the battery pack coupled to the battery pack receptacle.

3. The battery pack charger of claim 2, wherein the second input is one of a low power mode, a medium power mode, a high power mode, and a set power output value.

4. The battery pack charger of claim 1, wherein the user interface is provided on the housing of the battery pack charger.

5. The battery pack charger of claim 1 further comprising: a wireless transceiver.

6. The battery pack charger of claim 5, wherein the user interface is provided on an external device that communicates with the battery pack charger via the wireless transceiver.

7. The battery pack charger of claim 1, wherein the power input circuit is configured to receive alternating current ("AC") power from a conventional wall outlet, convert the AC power to a direct current ("DC") power, and output the DC power to the charging circuit.

8. The battery pack charger of claim 7, wherein the controller is further operable to:

detect that the conventional wall outlet is providing power to a second device; and reduce, in response to detecting that the conventional wall outlet is providing power to the second device, the first power output level.

9. The battery pack charger of claim 1, further comprising an adapter that provides a second power output level to a device electrically coupled to the adapter, and wherein the controller is further configured to:

determine a total power consumption by the charging circuit and the adapter; and regulate the first power output level and the second power output level to ensure that a power interrupt within the battery pack charger is not tripped.

10. A battery charging system comprising: a battery pack; and a battery pack charger including: a housing; a battery pack receptacle supported by the housing, the battery pack receptacle configured to receive the battery pack; a charging circuit configured to transmit power from a power input circuit to the battery pack receptacle; and a battery pack charger controller operable to: receive a first input via a user interface, set a first power output level of the charging circuit based on the received first input, and provide the first power output level to the battery pack coupled to the battery pack receptacle, wherein the first input is one of a low power mode, a medium power mode, a high power mode, and a set power output value.

11. The battery pack charging system of claim 10, wherein the power input circuit is configured to receive alternating current ("AC") power from a conventional wall outlet, convert the AC power to a direct current ("DC") power, and output the DC power to the charging circuit.

12. The battery pack charging system of claim 11, wherein the battery pack charger controller is further configured to:

detect that the conventional wall outlet is providing power to a second device; and reduce, in response to detecting a that the conventional wall outlet is providing power to the second device, the first power output level.

13. The battery pack charging system of claim 10, further comprising an adapter that provides a second power output level to a device electrically coupled to the adapter, and wherein the battery pack charger controller is further configured to:

determine a total power consumption by the charging circuit and the adapter, and regulate the first power output level and the second power output level to ensure that a power interrupt within the battery pack charger is not tripped.

* * * * *